(12) United States Patent
Rose et al.

(10) Patent No.: US 12,476,506 B2
(45) Date of Patent: Nov. 18, 2025

(54) METHOD FOR PRODUCING A ROTOR OF AN ELECTRIC ROTATION MACHINE, AND ELECTRIC ROTATION MACHINE

(71) Applicant: Schaeffler Technologies AG & Co. KG, Herzogenaurach (DE)

(72) Inventors: Alexander Rose, Baden-Baden (DE); Florian Nachtmann, La Wantzenau (FR); Sebastien Oster, Hoerdt (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 224 days.

(21) Appl. No.: 18/285,893

(22) PCT Filed: Mar. 23, 2022

(86) PCT No.: PCT/DE2022/100221
§ 371 (c)(1),
(2) Date: Oct. 6, 2023

(87) PCT Pub. No.: WO2022/214131
PCT Pub. Date: Oct. 13, 2022

(65) Prior Publication Data
US 2024/0195247 A1    Jun. 13, 2024

(30) Foreign Application Priority Data
Apr. 9, 2021   (DE) ............... 10 2021 108 893.3

(51) Int. Cl.
*H02K 1/30* (2006.01)
*H02K 1/06* (2006.01)
*H02K 5/00* (2006.01)
*H02K 15/02* (2025.01)

(52) U.S. Cl.
CPC .................... *H02K 1/30* (2013.01)

(58) Field of Classification Search
CPC ............... H02K 1/30; H02K 1/26; H02K 15/02; H02K 1/22; H02K 1/06; H02K 5/00
USPC ............................ 310/89.216, 114
See application file for complete search history.

(56) References Cited

U.S. PATENT DOCUMENTS

2002/0036440 A1   3/2002   Shimada et al.

FOREIGN PATENT DOCUMENTS

| DE | 10309381 A1 | 9/2004 |
| DE | 102016200703 A1 * | 7/2017 | ............ F16B 5/045 |
| DE | 102018104653 A1 | 9/2017 |
| DE | 102019113596 A1 | 11/2020 |

(Continued)

*Primary Examiner* — Jose A Gonzalez Quinones

(57) ABSTRACT

A rotor of an electric rotation machine includes a shaft, a laminated core arranged coaxially on the shaft and configured to receive magnets or an electrical conductor, and a torque transmission element non-rotatably connected to a shank of the shaft. The laminated core includes a rotor end plate on an axial side thereof. The torque transmission element has a higher strength than the rotor end plate. The rotor end plate is connected to the torque transmission element via a pin extending into a through-hole and forming a frictional connection with a wall of the through-hole. One of the rotor end plate and the torque transmission element includes the pin, and the other of the rotor end plate and the transmission element includes the through-hole. The pin is formed via pressing into material of the one of the rotor end plate and the torque transmission element.

20 Claims, 1 Drawing Sheet

(56) References Cited

FOREIGN PATENT DOCUMENTS

| JP | 2013128359 A | * | 6/2013 | |
| WO | WO-2021209086 A1 | * | 10/2021 | ............. H02K 9/197 |

* cited by examiner

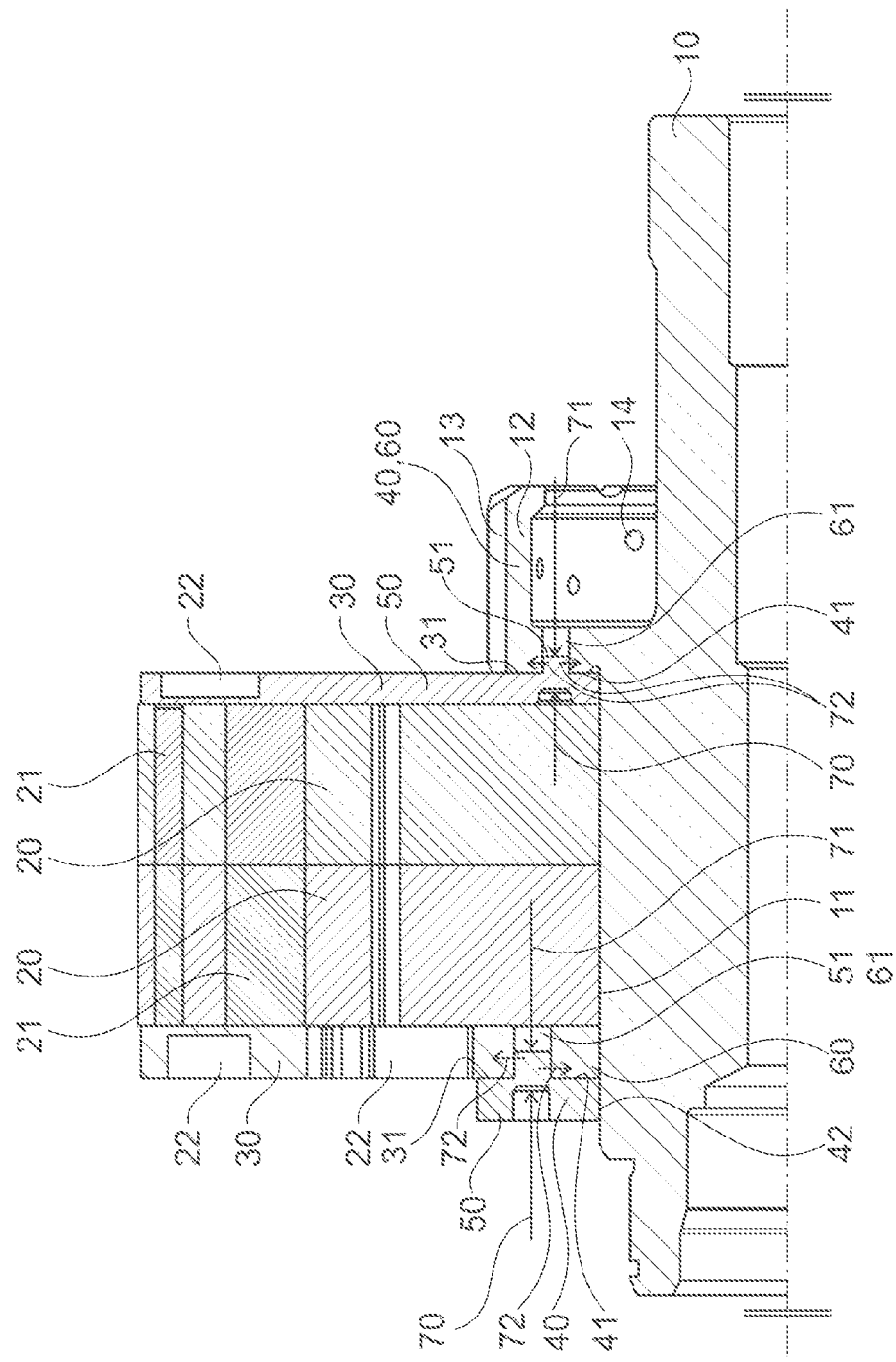

METHOD FOR PRODUCING A ROTOR OF AN ELECTRIC ROTATION MACHINE, AND ELECTRIC ROTATION MACHINE

CROSS-REFERENCE TO RELATED APPLICATIONS

This application is the U.S. National Phase of PCT Appln. No. PCT/DE2022/100221 filed Mar. 23, 2022, which claims priority to DE 102021108893.3 filed Apr. 9, 2021, the entire disclosures of which are incorporated by reference herein.

TECHNICAL FIELD

The present disclosure relates to a method for mechanically connecting two components in a rigid manner to a rotor of an electric rotation machine, to a method for producing the rotor of the electric rotation machine, and to the electric rotation machine.

BACKGROUND

Different methods are known from the prior art for the mechanical connection of plates. These include, among other things, clinching, in which material from a plate is pressed into a die using a punch, where the material forms an undercut for positive axial fastening in a rigid manner. Another method for connecting plate parts is riveting with different embodiments of a respective rivet. There are force-fitting methods for arranging components on shafts, such as hot fitting. Such methods can also be used in the production of rotors of electric rotation machines.

A rotor of an electric rotation machine usually comprises a laminated core for holding magnets or magnets already integrated therein. Such a laminated core is usually closed axially by rotor end plates.

The connection between a rotor end plate and the shaft must be able to transmit high torques and high speeds due to the effect of the mass moment of inertia of a respective rotor end plate. In addition, the connection between the rotor end plate and the shaft must be absolutely free of play since rotor end plates usually have recesses that are used for signaling for eddy current sensors.

In addition, balancing bores are often arranged in rotor end plates in order to balance the entire rotor sub-assembly. Rotor end plates may be made of suitable aluminum alloy because in this embodiment eddy current losses in relation to the stator and weight are minimized.

A common method for arranging the rotor end plate on the shaft in a force-fitting manner is to shrink it onto the shaft. In addition, a steel ring can be arranged on the shaft using radial pressure. In this embodiment it is usually provided that the assembly of the rotor end plate and the steel ring is carried out in such a way that the rotor end plate and the steel ring are pressed axially against each other and are also provided in this axial preload in the assembled state.

The steel ring therefore represents an axial securing of the rotor end plate: it can only absorb the torsional moment introduced by the rotor end plate to a limited extent.

When operating an electric rotation machine, it cannot be ruled out that high impulse-like torques, so-called impact torques, are applied to the rotor. These act on the rotor, for example, by engaging a parking lock, misfiring a coupled internal combustion engine, introducing torque from a coupled wheel of a motor vehicle and strong accelerations of this wheel when driving on an uneven or slippery road surface.

A simple force-fitting connection between the rotor end plate and the shaft by means of a press fit may then no longer be able to withstand the loads that occur, depending on the mass moment of inertia of the rotor end plate.

SUMMARY

Proceeding from this, the present disclosure, according to an exemplary embodiment, provides a method for mechanically connecting two components in a rigid manner to a rotor of an electric rotation machine, a method for producing the rotor of the electric rotation machine and the electric rotation machine, which is efficient and space-saving ensure the fixation of rotor end plates on the shaft of a rotor.

The features of the claims can be combined in any technically useful manner, wherein the explanations from the following description as well as features from the figures can also be consulted for this purpose, which comprise supplementary embodiments of the present disclosure.

The present disclosure relates to a method for mechanically connecting two components in a rigid manner, in which a first component and a second component are provided, at least one pin is produced in the first component by pressing into the material of the first component, and at least one through-hole is produced in the second component, a pin of the first component is introduced into a through-hole of the second component, and a pressing force and/or a pulse is applied to the pin in the axial direction thereof via a pressing element, and a counter pressure force and/or a counter pulse is applied to the pin in the axial direction opposite the pressing direction of the pressing force via a counter pressing element in the through-hole such that pin material located between the pressing elements is moved radially and a force-fitting connection is produced with the wall of the through-hole.

This means that, unlike a conventional riveting method, no closing head is generated on an end face of the second component using the counter-pressing element, since the counter-pressure force is generated within the through-hole. There is also no rivet head of a rivet.

It is pressed into the first component in particular via a stamp as a pressing element. As a result, material from the first component shifts to the side opposite the stamp and appears there as a pin or projection, similar to a deep-drawing process. Depending on the thickness of the first component, the pin can optionally be designed to be hollow on the inside. Such a pin can also be referred to as a through-passage.

The force connection with the hole wall of the through-hole produces a hole bearing tension or a hole bearing pressure, which ensures a permanent mechanical connection between the pin and the through-hole and consequently between the two components in the axial direction. In the radial direction, the two components are connected to one another in a force-fitting and form-fitting manner.

The axial direction here refers to the direction in which the pin is formed, i.e., its longitudinal direction. Accordingly, the radial direction refers to the direction transverse thereto, i.e., transverse to the longitudinal direction of the pin and transverse to the effective direction of the pressure forces applied by the pressing element and the counter pressing element.

The method according to the present disclosure is designed in a similar manner to clinching, although in the method according to the present disclosure the undercut created during clinching does not necessarily have to be created in the material of the die, which here corresponds to the second component. The method according to the present disclosure can also be referred to as rivet welding.

Before the radial expansion of the pin, its outer diameter Da can have the following ratio in relation to the inner diameter Di of the through-hole: Da/Di=0.85 to 1. This means that before the pin is radially expanded, it can form a clearance fit in relation to the through-hole. This makes it easier to insert the pin into the through-hole. The hole embedding is only achieved through the radial expansion of the pin. In the context of the present invention, the terms "radial," "axial" and "circumferential direction" refer to the axis of rotation of the shaft or to the longitudinal axis of a respective pin.

The method according to the present disclosure can be carried out in such a way that the formation of the pin takes place simultaneously with the introduction of the pin into the through-hole of the second component.

An alternative procedure would be to produce the pin before it is introduced into the through-hole, in particular at the same time as a punching process to form the outer contour of the first component.

In an embodiment of the method, it is provided that the pin is created from the material of the first component via the compressive force.

Accordingly, in this embodiment it is provided that the pressing element is used not only to realize the radial expansion of the pin, but also to produce the pin in the first place. Accordingly, the production of the pin and the radial expansion of the pin can essentially be carried out in one work process in that the pin is produced in the through-hole of the second component via the pressing element and at the same time or immediately afterwards a counter pressure force is applied in the through-hole by the counter pressing element against the pressing force realized by the pressing element, which leads to the radial expansion of the pin.

A further aspect of the present disclosure is a rotor of an electric rotation machine, comprising a shaft and a laminated core arranged coaxially on the shaft for receiving magnets or at least one electrical conductor, wherein the laminated core has a rotor end plate on at least one axial side, and the rotor has a torque transmission element which is non-rotatably connected to a shank of the shaft and has a higher strength than the rotor end plate. The rotor end plate is connected to the torque transmission element via the method according to the present disclosure for mechanically connecting two components in a rigid manner, wherein the rotor end plate is the first component or the second component, and the torque transmission element is the other component.

The laminated core can already have the magnets or electrical conductors, or can be set up to receive magnets or electrical conductors.

In an embodiment, it is provided that a rotor end plate is arranged axially on both sides of the laminated core.

The relevant strength of the torque transmission element is in particular the compressive strength and/or shear strength.

In an embodiment of the rotor, it is provided that the torque transmission element is a ring which is non-rotatably connected to the shaft, or in that the torque transmission element is an integral part of the shaft.

The non-rotatable connection of the torque transmission element to the shaft can be realized in particular by shrinking the torque transmission element onto the shaft of the shaft.

In an embodiment, the torque transmission element can be an integral part of the shaft, in particular a shoulder formed by the shaft.

In particular, the torque transmission element can be connected to the shaft via a press fit. This embodiment refers to the variant of the torque transmission element in which it is connected to the shaft in a rotationally fixed manner as an extra element.

It is provided that the torque transmission element is the first component and that the rotor end plate is the second component, or that the rotor end plate is the first component and that the torque transmission element is the second component.

In the first-mentioned embodiment, it is provided that the pin is produced from the material of the torque transmission element and is inserted into the through-hole of the rotor end plate. This embodiment occurs in particular in the embodiment in which the torque transmission element is arranged as an extra component on the shaft.

In the second-mentioned embodiment it is provided that the pin is produced from the material of the rotor end plate and is inserted into the through-hole of the torque transmission element. This embodiment occurs in particular in the embodiment in which the torque transmission element is an integral part of the shaft.

Irrespective of whether the torque transmission element forms the first component or the second component and the rotor end plate forms the other component, in an embodiment both components have contact surfaces running essentially perpendicularly to the axis of rotation of the shaft, which when the two components are fastened to one another rest, if necessary press against each other.

The material of the torque transmission element can be steel, and the rotor end plate can at least predominantly consist of an aluminum alloy, although the design of the rotor end plate from another material, such as steel, should not be ruled out.

Another aspect of the present disclosure is a method for producing a rotor of an electric rotation machine, in which the following steps are carried out:

A shaft, at least one rotor end plate and at least one torque transmission element as well as a laminated core for receiving magnets or at least one electrical conductor are provided: the rotor end plate is connected to the torque transmission element via the method according to the present disclosure for mechanically connecting two components in a rigid manner, wherein the rotor end plate is the first component or the second component, and the torque transmission element is the other component, and after this step the laminated core is arranged coaxially on the shaft such that an axial termination of the laminated core is formed by the rotor end plate.

This method can be carried out in different configurations. In the embodiment in which the torque transmission element is provided as an extra component in the form of a ring, it is provided that first a sub-assembly of the rotor end plate and the torque transmission element is produced according to the method according to the present disclosure for mechanically connecting two components in a rigid manner, and then this sub-assembly is connected to the shank of the shaft in a rigid manner, in particular by hot assembly of the ring or the torque transmission element onto the shaft. The shaft may have been cooled beforehand. This creates a mechanical connection in a rigid manner between the shaft and the rotor end plate via the torque transmission element.

In the embodiment in which the torque transmission element is designed as an integral part of the shaft, in particular as a shoulder, a mechanical connection in a rigid manner takes place between this torque transmission element and the rotor end plate after the rotor end plate has been positioned on the shaft. The laminated core can be mechanically connected in a rigid manner to the rotor end plate in the circumferential direction and/or in the axial direction. The rotor end plate as well as the torque transmission element and possibly also a respective laminated core are automatically centered in relation to one another by the arrangement on the shaft due to their inner diameter or radial boundaries.

In addition, the present disclosure provides an electric rotation machine which comprises a rotor according to the present disclosure.

BRIEF DESCRIPTION OF THE DRAWINGS

The present disclosure described above is explained in detail below based on the relevant technical background with reference to the associated drawing, which shows an embodiment of the present disclosure in detail. The present disclosure is in no way restricted by the purely schematic drawing, wherein it should be noted that the exemplary embodiment shown in the drawing is not limited to the dimensions shown. In the drawings:

FIG. 1: shows a rotor produced according to the present disclosure in sectional view.

DETAILED DESCRIPTION

The rotor shown in FIG. 1 comprises a shaft 10, on the shank 11 of which multiple laminated cores 20 are arranged. These laminated cores 20 can, for example, be non-rotatably connected to the shaft 10 via a suitable torque transmission connection, such as with a spline, not shown here. The laminated cores 20 are penetrated by magnets 21 in the embodiment shown here.

Axially on both sides of the laminated cores 20, the rotor comprises a rotor end plate 30. According to the embodiment shown here, both rotor end plates 30 are provided with balancing bores 22. In the embodiment of the rotor shown in FIG. 1, the rotor end plates 30 are attached to the shaft 10 in different variants.

First, the embodiment is explained using the left side of the rotor.

Here, the rotor comprises a torque transmission element 40 in the form of a ring. This torque transmission element 40 is a first component 50, which is non-rotatably connected to the rotor end plate 30, which here forms a second component 60.

The non-rotatable connection is realized in that a pressure force 70 was directed onto the first component 50 or the torque transmission element 40, via a pressing element, not shown here, in such a way that a pin 51 is formed on the side of the torque transmission element 40 opposite the action of the pressing force 70.

The second component 60, or the rotor end plate 30, has a through-hole 61, which is designed to be complementary in terms of the shape and size of the cross section of the pin 51 and also the position of the pin 51.

This enables the pin 51 to be inserted into the through-hole 61. The pin 51 can have been formed with a contact surface 41 on a contact surface 31 of the rotor end plate 30 before the torque transmission element 40 comes into contact, and can only penetrate into the through-hole 61 when the two contact surfaces 31, 41 contact each other. The torque transmission element 40 and rotor end plate 30 are centered automatically on their inner diameter or inner radial boundary edge by the shank 11 of the shaft 10.

In an alternative embodiment, it is provided that the two contact surfaces 31, 41 are brought into contact with one another and only then is the pin 51 formed in the torque transmission element 40 and thus simultaneously penetrates the through-hole 61.

According to the method according to the present disclosure for mechanically connecting two components in a rigid manner, a counter pressure force 71 that is opposite to the pressing force 70 is applied to the pin 51 in the axial direction, such that material of the pin 51 experiences a radial displacement 72. This results in the pin 51 pressing radially against the wall of the through-hole 61 and in this way a non-positive connection in the axial direction between the first component 50 and the second component or between the torque transmission element 40 and the rotor end plate 30 is realized.

The torque transmission element 40, which is designed here as an extra ring, is fastened with a press fit 42 on the shank 11 of the shaft 10. This press fit 42 can be realized in particular by heating the torque transmission element 40. As a result, the rotor end plate 30 is also fastened on the left side of the rotor shown by means of this force-fitting connection.

Another embodiment is shown on the right side of the rotor. A torque transmission element 40 is also provided here, but this is designed in the form of a shoulder 12 of the shaft 10.

In contrast to the embodiment shown on the left, the torque transmission element 40 is an integral part of the shaft 10 here.

In the embodiment shown on the right side, the torque transmission element 40 also comprises a contact surface 41 which rests axially on a contact surface 31 of the rotor end plate 30. In this embodiment, the rotor end plate 30 is designed as the first component 50, and the torque transmission element 40, designed as the shoulder 12, is designed as the second component 60.

Accordingly, it is provided here that the pin 51 is formed by the action of the pressing force 70 on the rotor end plate 30 on the side opposite the action of the pressing force 70. The torque transmission element 40, or the shoulder 12, has an axially extending through-hole 61, which is designed to be complementary in terms of the shape and size of the cross section of the pin 51 and also the position of the pin 51.

In this embodiment too, by applying the counter pressure force 71 to the axial end face of the pin 51, the material of the pin 51 experiences the radial displacement 72 and thus presses against the wall of the through-hole 61, thus realizing a force-fitting connection.

In addition to fastening the rotor end plate 30, the shoulder 12 also serves to arrange clutch plates, not shown here, via the spline 13. In addition, in the embodiment shown here, the shoulder 12 has multiple radial bores 14 to enable fluid flows for the purpose of cooling and/or lubrication of units located in the vicinity of the rotor.

The rotor shown can be assembled in such a way that first the rotor end plate 30 on the right-hand side is connected in a rigid manner to the shoulder 12 of the shaft 10 designed as a torque transmission element 40. The laminated cores 20 can then be positioned on the shaft 10. Axially opposite the rotor end plate 30 on the right side, a sub-assembly comprising the rotor end plate 30 and the torque transmission element 40 in the form of the ring, which is present as an extra component, can be arranged on the shaft 10. This sub-assembly can be prefabricated before assembly on the shaft 10 by fixing the rotor end plate 30 and the torque transmission element 40 to one another as described.

Due to the fact that a respective torque transmission element 40 can be made in particular of steel and can therefore have a higher strength than a rotor end plate 30 made of an aluminum alloy, and due to the fact that a large number of pin through-hole connections can be realized on the circumference around the shaft 10, a high mechanical strength of the connection between the rotor end plate 30 and the shaft 10 is guaranteed.

The aforementioned method for mechanically connecting two components in a rigid manner and the rotor produced using said method ensure a durable and rigid connection of rotor sheet metal ends to the shaft.

LIST OF REFERENCE SIGNS

10 Shaft
11 Shank
12 Shoulder
13 Splines
14 Radial bore
20 Laminated core
21 Magnet
22 Balancing bore
30 Rotor end plate
31 Contact surface of the rotor end plate
40 Torque transmission element
41 Contact surface of the torque transmission element
42 Press fit
50 First component
51 Pin
60 Second component
61 Through-hole
70 Pressing force
71 Counter pressure force
72 Radial displacement

The invention claimed is:

1. A rotor of an electric rotation machine, comprising:
a shaft;
a laminated core arranged coaxially on the shaft and configured to receive magnets or an electrical conductor, the laminated core having a rotor end plate on an axial side thereof; and
a torque transmission element non-rotatably connected to a shank of the shaft and having a higher strength than the rotor end plate;
wherein the rotor end plate is connected to the torque transmission element via a pin extending into a through-hole and forming a frictional connection with a wall of the through-hole;
wherein one of the rotor end plate and the torque transmission element includes the pin, and the other of the rotor end plate and the torque transmission element includes the through-hole;
wherein the pin is formed via pressing into material of the one of the rotor end plate and the torque transmission element.

2. The rotor according to claim 1, wherein the torque transmission element is a ring which is non-rotatably connected to the shaft.

3. The rotor according to claim 2, wherein the torque transmission element is connected to the shaft via a press fit.

4. The rotor according to claim 1, wherein the torque transmission element includes the pin and the rotor end plate includes the through-hole.

5. The rotor according to claim 1, wherein the rotor end plate includes the pin and the torque transmission element includes the through-hole.

6. A method for producing a rotor of an electric rotation machine, comprising:

providing a shaft, a rotor end plate, a torque transmission element, and a laminated core configured to receive magnets or an electrical conductor;
forming a pin on one of the rotor end plate and the torque transmission element via pressing material of the one of the rotor end plate and the torque transmission element;
introducing the pin into a through-hole on the other of the rotor end plate and the torque transmission element;
connecting the rotor end plate to the torque transmission element by applying a pressing force to the pin in an axial direction thereof via a pressing element and applying a counter pressure force to the pin in an opposite axial direction via a counter pressing element such that material of the pin located axially between the pressing element and the counter pressing element is displaced radially and a force-fitting connection is produced with a wall of the through-hole; and
then, arranging the laminated core coaxially on the shaft so that an axial termination of the laminated core is formed by the rotor end plate.

7. The method according to claim 6, wherein formation of the pin takes place simultaneously with introduction of the pin into the through-hole.

8. The method according to claim 6, wherein the pin is formed from material of the rotor end plate.

9. The rotor according to claim 1, wherein the torque transmission element is an integral part of the shaft.

10. The rotor according to claim 1, further comprising:
a further rotor end plate on a further, opposite axial side of the laminated core; and
a further torque transmission element non-rotatably connected to the shank of the shaft;
wherein the further rotor end plate is connected to the further torque transmission element via a further pin extending into a further through-hole and forming a frictional connection with a further wall of the further through-hole;
wherein one of the further rotor end plate and the further torque transmission element includes the further pin, and the other of the further rotor end plate and the further torque transmission element includes the further through-hole;
wherein the further pin is formed via pressing material of the one of the further rotor end plate and the further torque transmission element.

11. The rotor according to claim 10, wherein the torque transmission element is a ring which is non-rotatably connected to the shaft, and the further torque transmission element is an integral part of the shaft.

12. The rotor according to claim 10, wherein:
the torque transmission element includes the pin and the rotor end plate includes the through-hole; and
the further rotor end plate includes the pin and the further torque transmission element includes the through-hole.

13. The rotor according to claim 1, wherein the pin is arranged entirely within the through-hole.

14. The method according to claim 6, wherein the torque transmission element is an integral part of the shaft.

15. The method according to claim 6, further comprising:
providing a further rotor end plate and a further torque transmission element;
forming a further pin on one of the further rotor end plate and the further torque transmission element via pressing material of the one of the further rotor end plate and the further torque transmission element;

introducing the further pin into a further through-hole on the other of the further rotor end plate and the further torque transmission element;

connecting the further rotor end plate to the further torque transmission element by applying a further pressing force to the further pin in the axial direction thereof via the pressing element and applying a further counter pressure force to the further pin in the opposite axial direction via the counter pressing element such that material of the further pin located axially between the pressing element and the counter pressing element is displaced radially and a force-fitting connection is produced with a wall of the further through-hole; and after arranging the laminated core on the shaft, connecting the further torque transmission to the shaft so that a further, opposite axial termination of the laminated core is formed by the further rotor end.

16. The method according to claim 6, wherein the pin is formed from material of the torque transmission element.

17. The method according to claim 6, wherein the torque transmission element is a ring which is non-rotatably connected to the shaft.

18. The method according to claim 17, further comprising connecting the torque transmission element to the shaft via a press-fit.

19. The method according to claim 18, connecting the rotor end plate to the torque transmission element prior to connecting the torque transmission element to the shaft.

20. The method according to claim 6, wherein, after forming the force-fitting connection, the pin is arranged entirely within the through-hole.

* * * * *